Feb. 6, 1940.　　　　J. H. ISHMAEL　　　　2,189,362
SIGNAL
Filed Aug. 25, 1938　　　　2 Sheets-Sheet 1

Inventor
John H. Ishmael

By Clarence A. O'Brien
Hyman Berman
Attorneys

Feb. 6, 1940.  J. H. ISHMAEL  2,189,362
SIGNAL
Filed Aug. 25, 1938  2 Sheets-Sheet 2

Inventor
John H. Ishmael
By Clarence A. O'Brien
Hyman Berman
Attorneys

Patented Feb. 6, 1940

2,189,362

UNITED STATES PATENT OFFICE 2,189,362

SIGNAL

John H. Ishmael, Spearfish, S. Dak.

Application August 25, 1938, Serial No. 226,799

1 Claim. (Cl. 116—39)

This invention appertains to new and useful improvements in direction signals especially adapted for use on automobiles.

The principal object of the present invention is to provide a direction signal which can be readily operated by the suction effect of the intake manifold of the engine or in fact by any other power.

Another important object of the invention is to provide a simple and efficient direction signal capable of being placed on top of the automobile where it will be visible from all angles.

These and various other important objects and advantages of the invention will become apparent to the reader of the following specification.

Figure 1:
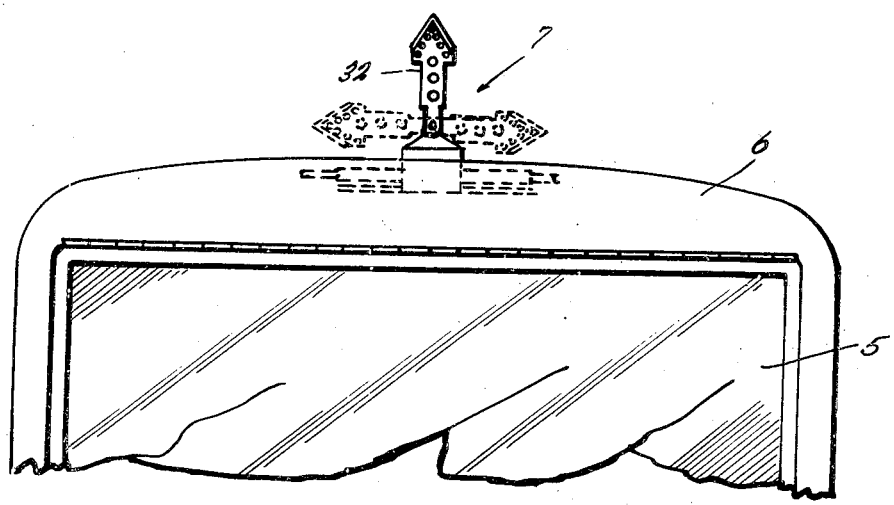
Figure 1 represents a fragmentary front elevational view of an automobile showing the signal mounted on the top thereof.
Figure 2:
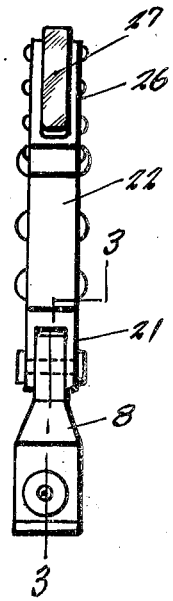
Fig. 2 is a side elevational view of the signal.
Figure 4:
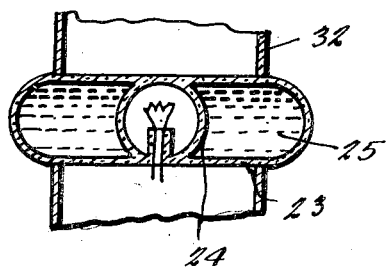
Fig. 4 is a fragmentary detailed sectional view on line 4—4 of Fig. 3.

Referring to the drawings wherein like numerals designate like parts, it can be seen in Fig. 1, that numeral 5 represents the usual automobile windshield while numeral 6 denotes the automobile top. The signal is generally referred to by numeral 7 and is mounted on the central portion of the top 6 where it is visible from all angles. The signal 7 includes the housing or casing 8 which partly depends through the top 6 and which has the laterally disposed plate or wing members 9—9 at its lower portion for attachment to the slats or frame-work construction of the top 6. Extending laterally from the casing 8 are the cylinders 10—11 in which the pistons 12—13 respectively, are operative. These pistons 12—13 are connected by the rod 14 having the rack gear 15 at its intermediate portion. This rack gear meshes with the mutilated gear 16. The shaft 17 carries the large mutilated gear 18 which meshes with the smaller mutilated gear 19 on the shaft 20. The shaft 20 has the leg portion 21 of the semaphore casing 22 secured thereto. The casing 22 is hollow as denoted in Fig. 4 and has transparent or translucent tubes 23 disposed therethrough at closed spaced intervals. These tubes have rounded end portions which protrude beyond opposite sides of the semaphore casing. Each tubular member 23 is provided with an electric or incandescent bulb 24 at its mid point while its end portions form compartments for containing glycerine 25 or other similar material which will glisten in daylight.

The outer end of the semaphore casing 23 is bifurcated as at 26, and contains the transparent or transluscent triangular formation 27 in which a light can be positioned.

For equalizing the position of the semaphore to a straight vertical section, coiled compressible springs 28—28 extend from pins 29 on the gear 18 to anchoring members 30 on the inside of the casing 8.

Figure 3:
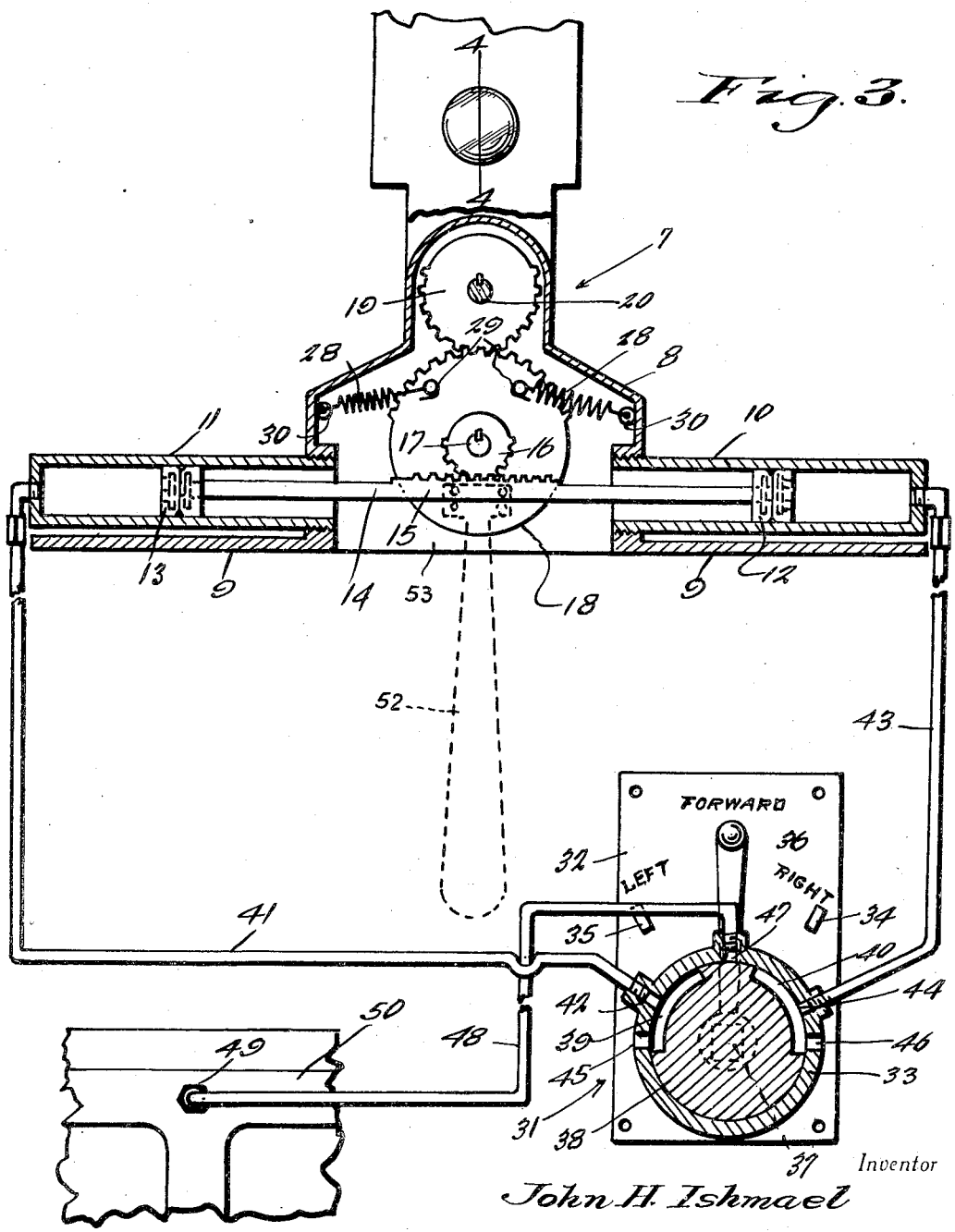
Fig. 3 is an enlarged fragmentary vertical sectional view through the signal and diagrammatically showing the pipe lines to the intake manifold and valve.

As shown in Fig. 3, numeral 31 represents the valve member which can be located adjacent the driver's seat or on the instrument board, (not shown). This valve consists of the base plate 32 with the shelf 33 secured thereto. On the base plate 32 are the two stops 34—35 for limiting the action of the handle 36, which handle is secured to the shaft 37 for actuating the rotor 38. This rotor 38 is provided with slots 39—40 therein. The tube 41 from the cylinder 11 communicates with the groove or slot 39 at the point 42, while the tube 43 from the cylinder 10 communicates with the channel 40 as at 44. Numerals 45—46 represent bleeder vents in the shell 33. The numeral 47 is a common suction portion from which extends the tube 48 to the conductor 49 on the intake manifold 50 of the engine.

It can now be seen that in the event the signal is to be pointed toward the right, the handle 36 is moved toward the right and against the stop 34 in Fig. 3 which brings into communication the port 47 and port 42 by way of the channel 39. Thus the suction effect of the engine is extended to the cylinder 1 and draws the piston 13 toward the left in the cylinder 11. This action also takes place in reverse order when the handle 36 is moved toward the left in Fig. 3.

It is to be understood, that this signal apparatus as shown in Fig. 1 is to be located on top of the vehicle approximately midway between the front and rear thereof so that it will be visible from all directions.

Should it be desired to operate the signal manually, the handle 52 depending from the bar 14 through the slot 53 can be actuated longitudinally of the slot 53 for reciprocating the rack bar 14.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A direction signal comprising an elongated plate having an upstanding housing, a pair of opposed sides of the housing being formed with threaded openings, a pair of cylinders each having one end threadedly disposed into a corresponding threaded opening, a fluid operated piston in each of the cylinders, a bar connecting the said pistons and extending through the lower portion of the housing, a semaphore, a gear for operating the semaphore, a pinion carried by the gear, a rack on the bar meshing with the pinion, protuberances on the side of the gear and spring members extending from the protuberances and being connected to the inner side of the housing for centralizing the position of the gear and semaphore.

JOHN H. ISHMAEL.